United States Patent [19]

Gondo et al.

[11] 4,062,705
[45] Dec. 13, 1977

[54] METHOD FOR HEAT TREATMENT OF HIGH-TOUGHNESS WELD METALS

[75] Inventors: Hisashi Gondo; Hajime Nakasugi, both of Kisarazu; Turugi Kimura; Masanobu Yamaguti, both of Kimitsu all of Japan

[73] Assignee: Nippon Steel Corporation, Tokyo, Japan

[21] Appl. No.: 492,754

[22] Filed: July 29, 1974

[30] Foreign Application Priority Data

July 31, 1973 Japan .................................. 48-86246

[51] Int. Cl.$^2$ .............................................. C21D 9/50
[52] U.S. Cl. .................................. 148/127; 75/124; 148/134; 148/143; 148/144; 428/615
[58] Field of Search .................. 75/123, 124; 219/146; 148/134, 143, 144, 127, 34, 36

[56] References Cited

U.S. PATENT DOCUMENTS

| | | | |
|---|---|---|---|
| 2,032,977 | 3/1936 | Delachaux | 148/127 |
| 2,853,379 | 9/1958 | Althouse | 75/124 |
| 3,110,798 | 11/1963 | Keay et al. | 75/124 |
| 3,216,823 | 11/1965 | Gulya et al. | 75/124 |
| 3,470,037 | 9/1969 | Suzuki | 148/127 |
| 3,573,898 | 4/1971 | Murai et al. | 75/124 |
| 3,592,633 | 7/1971 | Osuka et al. | 75/124 |
| 3,645,723 | 2/1972 | Riedel | 75/124 |
| 3,664,830 | 5/1972 | Kambayashi et al. | 75/124 |
| 3,745,294 | 7/1973 | Arikawa | 148/24 |
| 3,773,500 | 11/1973 | Kanazowa | 75/123 M |

FOREIGN PATENT DOCUMENTS

744,600   2/1956   United Kingdom .................. 148/36

*Primary Examiner*—C. Lovell
*Attorney, Agent, or Firm*—Toren, McGeady and Stanger

[57] ABSTRACT

A method for obtaining a weld metal having excellent toughness at low temperatures as below -40° C, which method comprises heating the weld metal having a specific steel composition to its austenitizing temperature and cooling it or holding it at the temperature for not longer than 25 minutes and then quenching and tempering it. In order to further improve the low temperature toughness, the weld metal is reheated again to the $Ac_1$ to $Ac_3$ range. Excellent low temperature toughness of the weld metal can be obtained without the necessity of using any special welding materials.

7 Claims, 6 Drawing Figures

METHOD FOR HEAT TREATMENT OF HIGH-TOUGHNESS WELD METALS

The present invention relates to a method for heat treatment of high-toughness weld metals useable at a low temperature below −40° C and even below −60° C. Recently, demands for low-temperature toughness of steel materials have been increasingly severe, and this tendency has been accelerated for steel materials of transfer pipe lines for crude oil and gas by the developments of extremely cold regions in the world. In this particular applications, the demands for low-temperature toughness include not only a demand for base steels such as steel plates and pipes but also a demand for similar level of notch-toughness of weld heat-affected zones and weld metals. In this case, the weld heat-affected zones can be given similar level of qualities as the base steel by means of annealing, quenching and tempering, but the weld metals can not always be given such a level of qualities by such treatments.

In order to solve the problem, a conventional method uses a special welding material (for example austenitic welding materials) and has been successful on a commercial scale to assure low-temperature toughness down to about −40° C. However, according to the conventional method, it is not possible to obtain satisfactory low-temperature toughness below −40° C even when the special austenitic welding materials are used, and demands for low-temperature toughness below −40° C have never been satisfied up to the present invention.

Therefore, an object of the present invention is to provide a method of heat treatment of weld metals, which can give excellent toughness of welded metals at a low temperature below −40° C and further −60° C without necessity of using special welding materials at low cost on a commercial scale.

For this object of the present invention, the present inventors have conducted various extensive studies mainly on thin-walled large-diameter pipes, ranging from the ferrite micro-structure to the martensite microstructure, and have found that the controlling factors for the notch toughness below −40° C of the weld metals are mainly O, C, Si, Mn, P, S and Al, and that the steel composition must be limited to the following ranges:

O : not more than 0.040%
C : not more than 0.15%
Si : 0.10 to 0.50%
Mn : 0.35 to 3.5%
P : not more than 0.035%
S : not more than 0.030%
Al : 0.01 to 0.25%
Balance: Fe and unavoidable impurities Among the above elements, the O content is the most important factor. Thus the notch toughness of the weld metal which has been quenched and tempered or normalized is determined by the O level.

This is due to the fact that the size and amount of inclusions in the weld metal are determined by the level of O content and the toughness is determined by the notch-effect of the inclusions. Particularly when the level of O content is 0.040% or more, the interspace between inclusion and inclusions are shortened and become almost equal to the fracture unit, thus remarkably deteriorating the notch toughness. For this reason, it is necessary to limit the O content to 0.04% or less in the weld metal for heat treatment.

According to prior studies on heat treatments of steel materials, it has been long a common knowledge that the notch toughness depends remarkably on the steel composition when the steel is quenched and tempered. But the steel materials discussed by the prior arts cover only steels containing less than 0.005% O, which is an extremely low oxygen level in the case of weld metals. Thus the prior studies can give no guidance to the present invention which is directed to a field of a high level of oxygen content in the weld metal which is produced during a commercial production process. Up to now, almost no study has been conducted on the heat treatments of high oxygen steel materials, and the present invention has important significance in the field of weld metals for heat treatment in the discovery of the oxygen as the deciding factor of notch toughness below −40° C and of the upper limit of the oxygen content for that purpose.

Therefore, according to the present invention a special welding material is not required as mentioned before and commercial steel compositions may be used for the welding material, but it is necessary to prevent the oxygen from coming into the weld metal from the welding flux, etc. so that the oxygen content may be not more than 0.040% in the steel as welded.

The present invention will be described in more details referring to the attached drawings.

FIG. 5(A) is its plane view and FIG. 5(B) is a side view.

Figure 1:
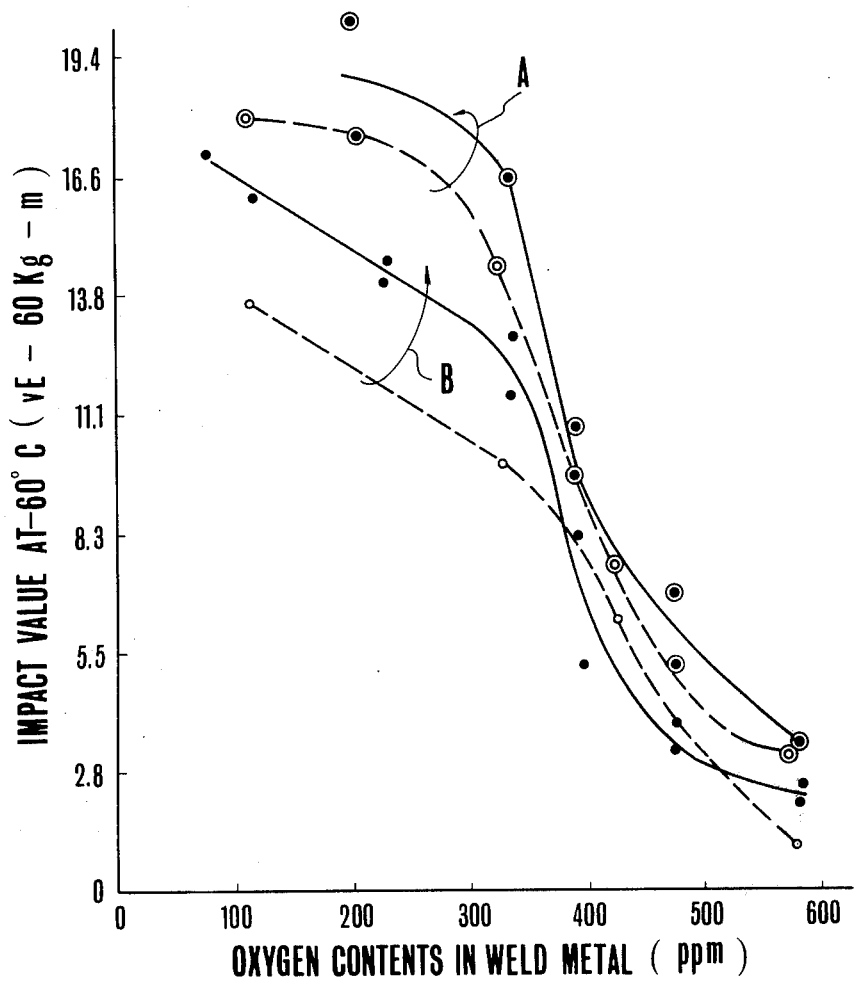
FIG. 1 is a graph showing relation between the oxygen contents in the weld metals and the impact values at −60° C.

The limitation of the oxygen content will be explained referring to FIG. 1 which shows the relation between the notch toughness at a low temperature (−60° C) of a weld metal which has been cooled to room temperature after completion of welding and the oxygen content in the weld metal. In FIG. 1;
- ● : Weld metal of 0.09% C, 0.35% Si, 1.65% Mn
- ○ : Weld metal of 0.09% C, 0.35% Si, 1.65% Mn, 0.1% Mo Refining Conditions(A):
    First quenching at 900° C and holding 40 seconds, water cooled
    Secondary quenching at 850° C and holding for 40 seconds, water cooled
    Tempering: at 650° C for 40 seconds, water cooled Refining Conditions(B): (ordinary quenching and tempering)
    Quenching at 910° C for 60 seconds, water cooled
    Tempering: at 650° C for 60 seconds, water cooled As understood from FIG. 1, the notch toughness at a low temperature (−60° C) is determined mainly by the level of oxygen content irrespective of the steel composition.

As described above, high toughness can be obtained by a suitable heat treatment when the oxygen content is not more than 0.040%. According to the present invention, the starting temperature of reheating must be not higher than 600° C, or the reheating must be started from a temperature where 60% of transformation has been completed.

In case of small scale weldings, the reheating is usually started after the welding is at room temperature, but it is desirable that the heat treatment be done simultaneously with the welding for lowering the production cost on a commercial scale. In this case, the starting temperature of the heating is important, and satisfactory improvement of toughness can not be obtained outside the above conditions. The limitation of the starting temperature will be described referring to FIG. 2, which shows the relation between the initial temperature of the reheating to quenching temperature and the toughness, particularly in case of a weld metal of 0.09% C, 0.35% Si and 1.65% Mn marked by • in FIG. 1. The figures in parentheses represent the ratio (%) of the completion of ferrite-pearlite transformation.

Figure 2:
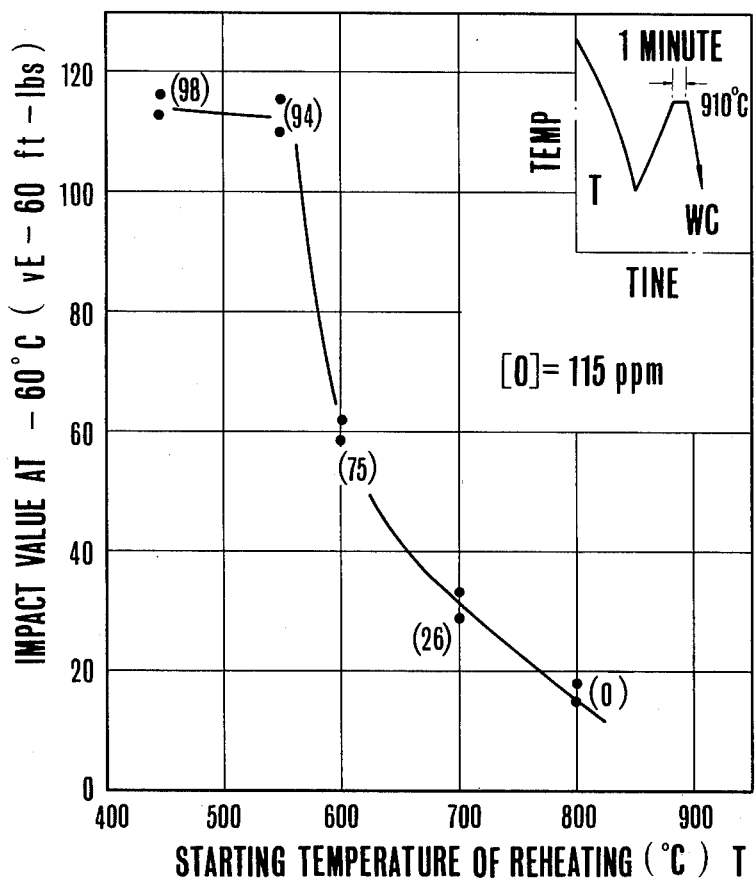
FIG. 2 is a graph showing the relation between the starting temperatures of reheating and the impact values at −60° C.

As understood from FIG. 2, if the initial temperature of the heat treatment is beyond 600° C or if at least 60% of the transformation has not been attained, the notch toughness is not improved even when the oxygen content in the weld metal is less than 0.040% This is due to the fact that when the austenite grains formed during the cooling after the welding are reheated from a high temperature outside the above condition, the austenite grains grow coarse, thus lowering the toughness.

Further, the holding time also must be limited for the following reasons.

When the holding time is excessively elongated after the steel has been once heated to a required temperature, the toughness will be deteriorated even in case of a weld metal of less than 0.040% oxygen content. The present inventors have found the holding time should be limited to 25 minutes at longest. The limitation of the holding time can be illustrated from the following examples too.

Figure 3:
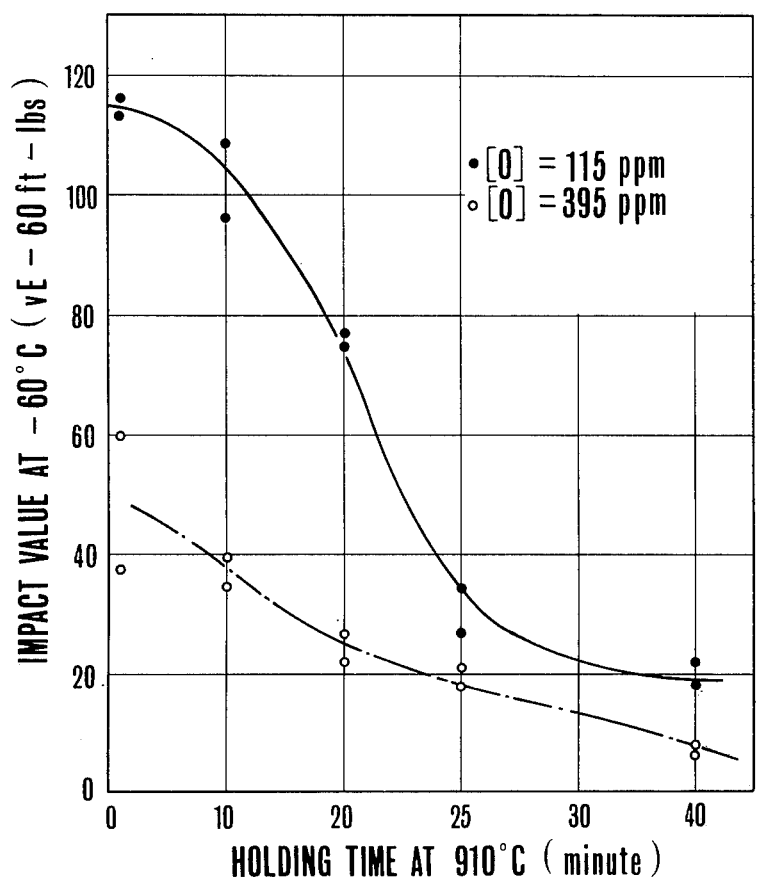
FIG. 3 is a graph showing the relation between the holding time at 910° C and the impact values at −60° C.

FIG. 3 shows the relation between the holding times and the notch toughness in case of a weld metal of 0.09% C, 0.35% Si and 1.65% Mn marked by • in FIG. 1.

As clearly understood from FIG. 3, when the holding time exceeds 25 minutes, the toughness remarkably deteriorates in case of a weld metal, and this tendency becomes larger as the level of oxygen content becomes higher. This can be attributed to the toughness deterioration due to the growth of austenite grains and toughness deterioration due to embrittlement of the austenite grain boundaries by a long time heating which is peculiar to a high oxygen steel.

From the above descriptions, for the purpose of improving the notch toughness of the weld metal it is necessary to
1. maintain the oxygen content in a weld metal before heat treatment at a level not more than 0.040%
2. reheat the weld metal from a temperature not higher than 600° C, or from a temperature where the transformation has been accomplished 60% and
3. limit the holding time for the heating within 25 minutes.

The present invention is based on the above three features, but it is difficult to assure satisfactory toughness below −40° C if the contents of C, Si, Mn, P, S and Al are not limited as above.

The limitations of the component elements in the present invention will be explained hereinafter.

Regarding C, it has a general tendency that it lowers toughness as its content increases in cases of both the quenching-tempering treatment (herein called QT) and the normalizing treatment (herein called NORMA). In the case of QT treatments, with an excessive carbon content the martensite micro-structure formed at the time of quenching is converted into a high-carbon martensite structure so that toughness can not be improved even by tempering. The upper limit of the carbon content in case of a weld metal is 0.15%.

On the other hand, in the case of NORMA treatments, an excessive carbon content produces an upper bainite structure in the ferrite-pearlite structure, thus remarkably lowering the notch toughness so that the high toughness at −40° C as aimed at by the present invention can not be obtained.

Regarding Si, this element comes into the weld metal unavoidably from the steel material which also requires high-toughness giving element. The lower limit of the silicon content is 0.10%. When the silicon content in the weld metal is excessive, toughness will remarkably lower in case of both the QT and the NORMA treatments. The upper limit of the silicon content is 0.50%.

Mn is an element necessary for preventing blowholes in the weld metal as well as for deoxidation, and its lower limit for this purpose is 0.35%. On the other hand, when the manganese content is increased, toughness is improved, but when it exceeds 3.50%, remarkable temper embrittlement is caused at the time of tempering in the case of the QT treatment, and thus good toughness can not be obtained. Meanwhile, in case of the NORMA treatment, an excessive manganese content, just as carbon, produces an upper bainite microstructure in the micro-structure, thus lowering the notch toughness. Thus the upper limit of the manganese content is 3.50% in case of both of the treatments.

P and S are elements which come into the weld metal as impurities from the steel material and welding wires and fluxes. For the notch toughness, it is desirable that P and S are maintained as low as possible, but they may be present within the ranged as defined above and then upper limits are 0.035% P and 0.030% S. This means they are not intentionally added.

Al is an element necessary for deoxidation and for fixing nitrogen as AlN during the heat treatment. With an oxygen content not more than 0.040%, Al in an amount not less than 0.01% is required for obtaining satisfactory notch toughness with the above steel composition in case of the QT and NORMA treatments. On the other hand, when Al is present in an excessive amount, notch toughness of the weld metal as welded is remarkably poor, and there is much danger of rupture of the weld metals during various treatments other than the heat treatment and their handling before the heat treatment. Thus, the upper limit of the Al content is defined to 0.25%.

One modification of the present invention defines a method for quenching and tempering a weld metal which contains, in addition to the above elements, one or more of not more than 3.50% Ni, not more than 0.30% Cr, not more than 0.30% Mo, not more than 0.0020% B, not more than 0.04% Nb, not more than 0.05% V, and not more than 0.04% Ti. The chief object of addition of these elements is improvement of strength. According to the studies conducted by the present inventors, the toughness of a weld metal after quenching and tempering is determined primarily by the contents of O, C, Si, Mn, P, S and Al as mentioned above, but Ni, Cr, Mo, B, Nb, V, and Ti are respectively effective for improving strength without practically deteriorating toughness, but all of these elements except for Ni lower toughness if they are added to the weld metal. This is a remarkable difference from materials for heat treatment such as rolled steel plates containing less than 0.005% O. Thus, these elements should be limited in their addition amount. According to results of the studies conducted by the present invention, it has been found that it is necessary to limit the upper limits of Ni, Cr, Mo, V, Nb, Ti and B respectively to 3.05% Ni, 0.30% Cr, 0.30% Mo, 0.05% V, 0.04% Nb, 0.04% Ti and 0.0020% B in order to assure a high toughness (2 mm V Charpy impact value at −60° C: vE −60° C) at least 40 feet/lbs.

Further object of the present invention is to provide a method for refining the austenite grains to improve toughness. Thus, although the austenite grain size is refined to ASTM No. 9 – No. 10 by reheating the welded metal to the austenizing temperature and cooling it, the austenite grain size is further refined to ASTM No. 11 to No. 12 and toughness is improved when it is heated again from the $A_{c1}$ to $A_{c3}$ transformation temperature range and is cooled.

The reason for limiting the secondary heating temperature from the $AC_1$ to $AC_3$ transformation temperature range is similar to that for limiting the holding time within 25 minutes and the limitation is made in order to prevent the toughness deterioration due to the growth of austenite grains and the austenite grain boundary embrittlement due to a long heating time which is a phenomenon peculiar to weld metals containing a relatively high oxygen content, and the holding time of the secondary heating is limited within 25 minutes.

On the other hand, the reason for limiting the lower limit of the secondary heating temperature to the $AC_1$ point is that a heating temperature below this point gives only the tempering effect and does not produce refinement of the austenite grain, and thus no toughness improvement is effected.

Figure 4:
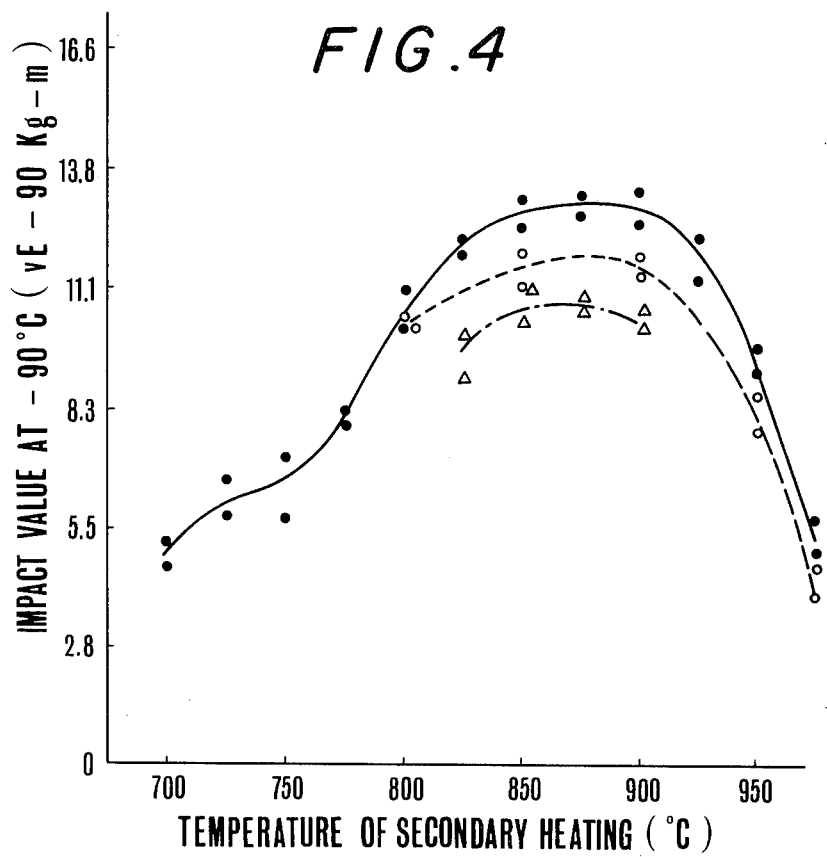
FIG. 4 is a graph showing the relation between the temperatures of the secondary heating and the impact values at −90° C.

FIG. 4 shows the relation between the secondary heating temperatures and the toughness, and it is understood from this graph that a desirable temperature range is between 800° C to the $AC_3$ transformation temperature. In FIG. 4,
- • represents weld metals of 0.09% C, 0.35% Si and 1.65% Mn
- ○ represents weld metals of 0.09% C, 0.35% Si, 1.65% Mn and 0.10% Mo
- △ represents weld metals of 0.09% C, 0.35% Si, 1.65% Mn and 0.15% Mo Refining Conditions: First quenching: at 925° C and holding for 40 seconds, water cooled
Tempering : at 650° C and holding for 60 seconds, water cooled As described above, the grain refinement of heat-treated weld metals is to be obtained by repetition of the transformation from austenite to ferrite or martensite in the present invention, the starting temperature of the heating has important significance, and it is naturally necessary that the reheating range is between the $Ac_1$ and the $Ac_3$ transformation temperature.

The present invention will be more clearly understood from the following examples.

EXAMPLE 1

Table 1

| Treatment | | Heat Treatment Conditions | | Cooling |
|---|---|---|---|---|
| | | Heating Temperature(° C) | Holding Time (sec.) | |
| NORMA | | 910 | 60 | air cooling |
| QT | Q | 910 | 60 | water cooling |
| | T | 650 | 60 | water cooling |

Table 2

| Chemical Composition of Sample Steel | | | | | |
|---|---|---|---|---|---|
| C | Si | Mn | P | S | Al |
| 0.09 | 0.28 | 1.20 | 0.012 | 0.006 | 0.018 |

Figure 5:
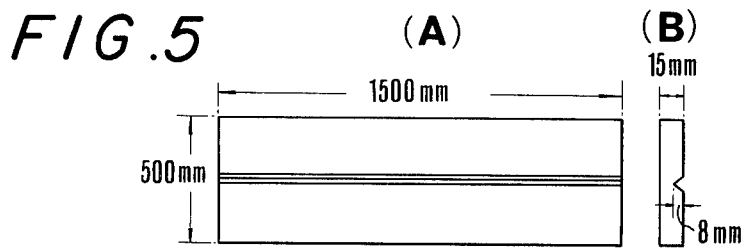
FIG. 5 shows welding groove preparation in Example 1 of the present invention.

The steel plate having the chemical composition shown in Table 2 was prepared to have a welding groove as shown in FIG. 5, and the welding edges were welded by manual welding or submerged arc welding and then the excessive deposited portion was ground to the plate surface. Then the heat treatment as shown in Table 1 was conducted and an impact sample was taken from the center of the weld metal. The notched portion of the sample was totally of weld metal. As for the method of making up the chemical composition of the weld metal, it was done by adjusting the welding wire in case of the manual welding, and in cae of the submerged arc welding it was done by combination of the welding wire and the flux, or by uniformly dispersing ferro-alloys in the welding groove. Tables 6 and 7 show the chemical compositions of the weld metals according to the present invention and the comparative materials, and their vE-60 values and hardness. In Table 6 (Example 1) the weld metals 1 to 9 of the present invention show better notch toughness than the comparative materials 10 to 19 and vE-60 values higher than 40 feet-lbs.

Also in Table 7 (Example 1), the weld metals 1 to 12 of the present invention show better toughness values than the comparative materials 13 to 19 and vE-60 values are higher than 40 feet-lbs.

EXAMPLE 2

The steel materials as rolled having the chemical composition shown in Table 3 were welded under the welding conditions shown in Table 4, and the excessively deposited portion was machined to the plate surface. Then Charpy test pieces were taken from the center of the weld metals after the heat treatments shown in Table 5.

The making-up of the chemical composition of the weld metals was done in the similar way as in Example 1.

vE-90 values and hardness values of the weld metals welded and treated under the conditions shown in Tables 4 and 5 are shown in Tables 6 and 7 in comparison with the comparative materials.

In Table 6 (Example 2) the weld metals No. 1 to 9 treated according to the present invention all show vE-90 values more than 40 ft/lbs and thus better properties than the comparative materials No. 10 to No. 19.

Also in Table 7 (Example 2), the weld metals treated according to the present invention show better results than the comparative materials No. 13 to No. 19 and vE-90 values more than 40 ft/lbs.

Table 3

| Chemical Compositions of Sample Steel (%) | | | | | |
|---|---|---|---|---|---|
| C | Si | Mn | P | S | Al |
| 0.09 | 0.28 | 1.20 | 0.012 | 0.006 | 0.018 |
| Plate thickness : 15 mm | | | | | |

Table 4

Figure 6:
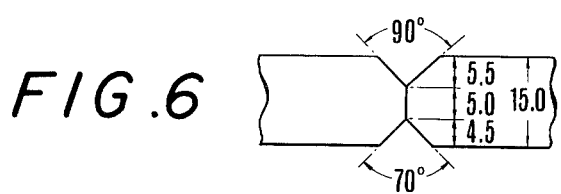
FIG. 6 shows welding groove preparation in Example 2 of the present invention.

| Welding Edge Form | Welding Conditions | |
|---|---|---|
| | Two wire tandem : one pass on both sides | |
| | Inside | out side |
| Shown in FIG. 6 | Preceeding $34^V \times 950^A$ | $36^V \times 1150^A$ |
| | Following $37^V \times 800^A$ | $40^V \times 900^A$ |
| | Welding speed 1.35 M/min. | 1.45 M/min. |

Table 5

| | Heat Treatment Conditions | | | | | |
|---|---|---|---|---|---|---|
| | First Heating | | | Secondary Heating | | |
| Conditions | Temp. °C | Holding time (sec) | Cooling | Temp. °C | Holding time (sec) | Cooling | Cooling Rate |
| A | 925 | 40 | Air | 900 | 40 | Air | 2° C/sec |
| B | " | " | Water | " | " | Water | 30° C/sec |
| C | " | " | " | 850 | " | " | 30° C/sec |

Remarks:
¹Those water cooled were tempered at 650° C.
²After the welding, test pieces were cooled to room temperature and heat-treated.
³Heat treatment was done by induction heating.

Table 6

| | | Chemical Compositions (%) | | | | | | |
|---|---|---|---|---|---|---|---|---|
| | | C | Si | Mn | P | S | Al | O |
| Steels of Present Invention | 1 | 0.03 | 0.15 | 0.85 | 0.014 | 0.012 | 0.018 | 0.0232 |
| | 2 | 0.03 | 0.15 | 0.85 | 0.014 | 0.012 | 0.018 | 0.0232 |
| | 3 | 0.14 | 0.40 | 1.82 | 0.020 | 0.008 | 0.023 | 0.0190 |
| | 4 | 0.14 | 0.40 | 1.82 | 0.020 | 0.008 | 0.023 | 0.0190 |
| | 5 | 0.09 | 0.25 | 3.40 | 0.018 | 0.006 | 0.042 | 0.0290 |
| | 6 | 0.09 | 0.25 | 3.40 | 0.018 | 0.006 | 0.042 | 0.0290 |
| | 7 | 0.09 | 0.24 | 1.45 | 0.017 | 0.009 | 0.210 | 0.0293 |
| | 8 | 0.09 | 0.24 | 1.45 | 0.017 | 0.009 | 0.210 | 0.0293 |
| | 9 | 0.09 | 0.35 | 1.65 | 0.025 | 0.008 | 0.023 | 0.0132 |
| Comparative Steels | 10 | 0.09 | 0.38 | 1.63 | 0.022 | 0.008 | 0.019 | 0.0420 |
| | 11 | 0.09 | 0.32 | 1.68 | 0.023 | 0.008 | 0.012 | 0.0810 |
| | 12 | 0.09 | 0.32 | 1.68 | 0.023 | 0.008 | 0.0120 | 0.0810 |
| | 13 | 0.02 | 0.15 | 0.25 | 0.014 | 0.008 | 0.028 | 0.0342 |
| | 14 | 0.02 | 0.15 | 0.25 | 0.014 | 0.008 | 0.028 | 0.0342 |
| | 15 | 0.09 | 0.28 | 3.82 | 0.021 | 0.012 | 0.029 | 0.0190 |
| | 16 | 0.09 | 0.28 | 3.82 | 0.021 | 0.012 | 0.029 | 0.0190 |
| | 17 | 0.09 | 0.63 | 1.61 | 0.020 | 0.009 | 0.032 | 0.0350 |
| | 18 | 0.11 | 0.28 | 1.63 | 0.019 | 0.007 | 0.336 | 0.0210 |
| | 19 | 0.22 | 0.28 | 1.62 | 0.018 | 0.008 | 0.027 | 0.0353 |

| | | Example 1 | | | Example 2 | | |
|---|---|---|---|---|---|---|---|
| | Plate Thickness (mm) | Treatment | Toughness vE-60 of Weld Metal | Hardness of Weld Metal | Treatment | Toughness vE-90 of Weld Metal | Hardness of Weld Metal |
| | | | ft/lbs | | | ft/lbs | Hv 10 |
| 1 | 15 | QT | 98 | 125 | B | 110 | 128 |
| 2 | 15 | N | 48 | 79 | A | 54 | 103 |
| 3 | 15 | QT | 87 | 240 | B | 89 | 238 |
| 4 | 15 | N | 68 | 175 | A | 56 | 168 |
| 5 | 15 | QT | 54 | 310 | C | 49 | 295 |
| 6 | 15 | N | 43 | 207 | A | 42 | 199 |
| 7 | 15 | QT | 105 | 187 | B | 85 | 182 |
| 8 | 15 | N | 60 | 136 | C | 89 | 176 |
| 9 | 15 | QT | 113 | 198 | C | 125 | 188 |
| 10 | 15 | QT | 26 | 202 | QT | 11.1 | 202 |
| 11 | 15 | QT | 4 | 210 | N | 5.5 | 155 |
| 12 | 15 | N | 3 | 140 | N | 0.4 | 140 |
| 13 | 15 | QT | 18 | 95 | QT | 1.4 | 95 |
| 14 | 15 | N | 3 | 57 | N | 0.6 | 57 |
| 15 | 15 | QT | 25 | 362 | QT | 3.2 | 362 |
| 16 | 15 | N | 3 | 215 | N | 0.6 | 215 |
| 17 | 15 | QT | 22 | 245 | QT | 2.5 | 245 |
| 18 | 15 | QT | 28 | 193 | QT | 3.5 | 193 |
| 19 | 15 | QT | 4 | 283 | QT | 0.4 | 283 |

Table 7

| | | Chemical Compositions (%) | | | | | | | | | | | | |
|---|---|---|---|---|---|---|---|---|---|---|---|---|---|---|
| | | C | Si | Mn | P | S | Al | O | Mo | Ni | Cr | B | Nb | V | Ti |
| Steels of Present Invention | 1 | 0.11 | 0.35 | 1.25 | 0.018 | 0.009 | 0.028 | 0.0350 | 0.25 | — | — | — | — | — | — |
| | 2 | 0.09 | 0.32 | 1.62 | 0.017 | 0.008 | 0.031 | 0.0327 | — | 1.27 | — | — | — | — | — |
| | 3 | 0.09 | 0.37 | 1.39 | 0.018 | 0.008 | 0.021 | 0.0342 | — | — | 0.25 | — | — | — | — |
| | 4 | 0.10 | 0.34 | 1.63 | 0.019 | 0.009 | 0.125 | 0.0344 | — | — | — | 0.0015 | — | — | — |
| | 5 | 0.09 | 0.28 | 1.27 | 0.013 | 0.009 | 0.032 | 0.0319 | 0.18 | 0.62 | — | — | — | — | — |
| | 6 | 0.09 | 0.27 | 1.31 | 0.015 | 0.008 | 0.024 | 0.0328 | — | 1.52 | 0.25 | — | — | — | — |
| | 7 | 0.07 | 0.38 | 1.29 | 0.014 | 0.008 | 0.140 | 0.0332 | 0.19 | — | — | 0.0016 | — | — | — |
| | 8 | 0.07 | 0.32 | 1.27 | 0.018 | 0.009 | 0.047 | 0.0347 | 0.20 | 0.30 | 0.18 | — | — | — | — |
| | 9 | 0.08 | 0.40 | 1.32 | 0.018 | 0.009 | 0.043 | 0.0311 | — | 1.30 | 0.15 | 0.0011 | — | — | — |
| | 10 | 0.09 | 0.27 | 1.42 | 0.017 | 0.008 | 0.025 | 0.0330 | — | 1.00 | — | — | 0.02 | — | — |
| | 11 | 0.09 | 0.26 | 1.48 | 0.017 | 0.008 | 0.021 | 0.0313 | — | 0.94 | — | — | — | 0.04 | — |
| | 12 | 0.11 | 0.26 | 1.45 | 0.016 | 0.009 | 0.030 | 0.0341 | — | 0.90 | — | — | — | — | 0.03 |
| | 13 | 0.10 | 0.23 | 1.42 | 0.018 | 0.008 | 0.033 | 0.0318 | — | — | — | — | 0.06 | — | — |
| | 14 | 0.09 | 0.27 | 1.38 | 0.020 | 0.011 | 0.018 | 0.0337 | — | — | — | — | — | 0.08 | — |
| | 15 | 0.09 | 0.30 | 1.34 | 0.020 | 0.011 | 0.022 | 0.0318 | — | — | — | — | — | — | 0.06 |
| | 16 | 0.10 | 0.31 | 1.42 | 0.017 | 0.008 | 0.027 | 0.0331 | 0.45 | — | — | — | — | — | — |
| | 17 | 0.10 | 0.29 | 1.48 | 0.017 | 0.008 | 0.025 | 0.0347 | 0.20 | 3.82 | — | — | — | — | — |
| | 18 | 0.11 | 0.32 | 1.49 | 0.018 | 0.008 | 0.029 | 0.0320 | — | — | 0.48 | — | — | — | — |
| | 19 | 0.10 | 0.34 | 1.42 | 0.018 | 0.009 | 0.081 | 0.0318 | — | — | — | 0.035 | — | — | — |

| | | Example 1 | | | | Example 2 | | | |
|---|---|---|---|---|---|---|---|---|---|
| | Plate Thickness (mm) | Toughness vE-60 of Weld Metal | Hardness of Weld Metal | Treatment | Ceq (%) | Toughness vE-90 of Weld Metal | Hardness of Weld Metal | Treatment | Ceq (%) |
| | | ft/lbs | Hv | | | ft/lbs | Hv 10 | | |
| 1 | 15 | 59 | 210 | QT | 0.381 | 52 | 204 | B | 0.381 |
| 2 | 15 | 75 | 215 | " | 0.392 | 83 | 212 | " | 0.392 |
| 3 | 15 | 55 | 203 | " | 0.392 | 54 | 208 | " | 0.392 |
| 4 | 15 | 60 | 238 | " | 0.372 | 55 | 231 | " | 0.372 |
| 5 | 15 | 69 | 210 | " | 0.362 | 73 | 207 | " | 0.362 |
| 6 | 15 | 42 | 234 | " | 0.406 | 41 | 231 | " | 0.406 |
| 7 | 15 | 73 | 198 | " | 0.354 | 68 | 198 | " | 0.354 |
| 8 | 15 | 87 | 195 | " | 0.306 | 63 | 194 | " | 0.306 |
| 9 | 15 | 58 | 249 | " | 0.369 | 52 | 247 | " | 0.369 |
| 10 | 15 | 45 | 179 | " | 0.352 | 47 | 182 | " | 0.352 |
| 11 | 15 | 62 | 220 | " | 0.361 | 56 | 213 | " | 0.361 |
| 12 | 15 | 41 | 210 | " | 0.374 | 44 | 206 | " | 0.37 |

Table 7-continued

| | | | | | | | | | |
|---|---|---|---|---|---|---|---|---|---|
| 13 | 15 | 28 | 172 | " | 0.336 | 3.9 | 172 | QT | 0.336 |
| 14 | 15 | 18 | 193 | " | 0.320 | 2.5 | 193 | " | 0.320 |
| 15 | 15 | 6 | 215 | " | 0.313 | 0.8 | 215 | " | 0.313 |
| 16 | 15 | 38 | 228 | " | 0.449 | 5.3 | 228 | " | 0.449 |
| 17 | 15 | 25 | 283 | " | 0.491 | 3.5 | 283 | " | 0.491 |
| 18 | 15 | 34 | 200 | " | 0.456 | 4.7 | 200 | " | 0.456 |
| 19 | 15 | 18 | 197 | " | 0.337 | 2.5 | 197 | " | 0.337 |

$$Ceq = C + \frac{1}{6} Mn + (\frac{1}{4} Mo + \frac{1}{5} Cr)$$

What is claimed is:

1. A method for heat treating a formed article having a weld therein, the weld metal consisting essentially of not more than 0.15% C, 0.10 to 0.50% Si, 0.35 to 3.50% Mn, not more than 0.035% P, not more than 0.030% S, 0.01 to 0.25% Al, from 0.0115% to 0.0395% O, with the balance being iron and minor impurities, which comprises heating the weld metal obtained after welding from a temperature less than 600° C or a point wherein at least 60% of the ferrite-pearlite transformation has been attained to its austenitizing temperature for not longer than 25 minutes and cooling it to obtain a high toughness weld material.

2. The method according to claim 1 in which the heated weld metal is held at the temperature for not longer than 25 minutes, and then quenched and tempered.

3. The method according to claim 1, in which the heated weld metal is held at the temperature for 25 minutes, and then cooled.

4. A method for heat treating a formed article having a weld therein, the weld metal consisting essentially of not more than 0.15% C, 0.10 to 0.50% Si, 0.35 to 3.50% Mn, not more than 0.035% P, not more than 0.030% S, 0.01 to 0.25% Al, from 0.0115 to 0.0395% O, and wherein the weld metal further contains one or more of not more than 3.5% Ni, not more than 0.30% Cr, not more than 0.30% Mo, not more than 0.0020% B, not more than 0.04% Nb, not more than 0.05% V and not more than 0.04% Ti with the balance being iron and minor impurities, which comprises heating the weld metal obtained after welding from a temperature less than 600° C or a point wherein at least 60% of the ferrite-pearlite transformation has been attained to its austenitizing temperature for not longer than 25 minutes and cooling it to obtain a high toughness weld metal.

5. A method for heat treating a formed article having a weld therein, the weld metal consisting essentially of not more than 0.15% C, 0.10 to 0.50% Si, 0.35 to 3.5% Mn, not more than 0.030% P, not more than 0.030% S, 0.01 to 0.25% Al, from 0.0115 to 0.0395% O, with the balance being iron and impurity elements, which comprises heating the weld metal from a temperature less than 600° C or a point wherein at least 60% of the ferrite-pearlite transformation has been attained after welding to its austenitizing temperature, cooling it, again heating it in a range from the $Ac_1$ point to the $Ac_3$ point, holding it at the temperature for not longer than 25 minutes, and cooling it.

6. The method according to claim 5, in which the weld metal held at the temperature for not longer than 25 minutes is further quenched and tempered.

7. A method for heat treating a formed article having a weld therein, the weld metal consisting essentially of not more than 0.15% C, 0.10 to 0.50% Si, 0.35 to 3.5% Mn, not more than 0.030% P, not more than 0.030% S, 0.01 to 0.25% Al, from 0.0115 to 0.0395% O, one or more of not more than 3.5% Ni, not more than 0.3% Cr, not more than 0.30% Mo, not more than 0.0020% B, not more than 0.04% Nb, not more than 0.05% V and not more than 0.04% Ti with the balance being iron and impurity elements, which comprises heating the weld metal from a temperature less than 600° C or a point wherein at least 60% of the ferrite-pearlite transformation has been attained after welding to its austenitizing temperature, cooling it, again heating it in a range from the $Ac_1$ point to the $Ac_3$ point, holding it at the temperature for not longer than 25 minutes, and cooling it.

* * * * *